United States Patent
Whiten et al.

(10) Patent No.: US 11,943,843 B2
(45) Date of Patent: Mar. 26, 2024

(54) GATEWAY DEVICE WITH CLOCK SPEED THAT REDUCES ELECTRO-MAGNETIC NOISE

(71) Applicant: ARRIS Enterprises LLC, Suwanee, GA (US)

(72) Inventors: Billy R. Whiten, Grayson, GA (US); David James Williams, Cumming, GA (US); Chad Lord, Buford, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 15 days.

(21) Appl. No.: 17/392,843

(22) Filed: Aug. 3, 2021

(65) Prior Publication Data

US 2022/0039206 A1    Feb. 3, 2022

Related U.S. Application Data

(60) Provisional application No. 63/060,406, filed on Aug. 3, 2020.

(51) Int. Cl.
| | | |
|---|---|---|
| *H04W 88/16* | (2009.01) | |
| *G06F 1/10* | (2006.01) | |
| *H04B 15/02* | (2006.01) | |

(52) U.S. Cl.
CPC .............. *H04W 88/16* (2013.01); *G06F 1/10* (2013.01); *H04B 15/02* (2013.01)

(58) Field of Classification Search
None
See application file for complete search history.

(56) References Cited

U.S. PATENT DOCUMENTS

| | | | | |
|---|---|---|---|---|
| 10,356,401 | B1* | 7/2019 | Zhang | H04N 21/41407 |
| 2007/0268854 | A1* | 11/2007 | Octaviano | H04W 28/20 |
| | | | | 370/328 |
| 2010/0058087 | A1* | 3/2010 | Borras | G06F 1/3275 |
| | | | | 713/322 |
| 2015/0079909 | A1* | 3/2015 | Soledade | H04B 15/02 |
| | | | | 455/63.3 |
| 2015/0100746 | A1* | 4/2015 | Rychlik | G06F 12/0607 |
| | | | | 711/157 |

(Continued)

FOREIGN PATENT DOCUMENTS

EP     3 467 665     4/2019

OTHER PUBLICATIONS

Wang et al, "Intelligent Radio Resource Management for IEEE 802.11 WLAN", IEEE, Jul. 19, 2004, ISBN 0-7803-8344-3 (Year: 2004).*

(Continued)

*Primary Examiner* — Kenny S Lin
(74) *Attorney, Agent, or Firm* — Wenderoth, Lind & Ponack, L.L.P.

(57) ABSTRACT

A network device includes: a radio configured to operate in a 2.4 GHz Wi-Fi band; a 32 bit double data rate (DDR) memory having instructions stored therein; a system clock configured to operate at 533 MHz; and a processor. The processor is configured to execute the instructions stored on the memory to cause the network device to: operate the 32 bit DDR memory at 1067 MHz; instruct the radio to transmit data to be transmitted in the 2.4 GHz Wi-Fi band; and instruct the radio to receive data to be received in the 2.4 GHz Wi-Fi band.

12 Claims, 11 Drawing Sheets

(56) References Cited

U.S. PATENT DOCUMENTS

2019/0229473 A1   7/2019  Lee et al.
2019/0357139 A1*  11/2019 Oh ..................... H04W 56/00
2020/0235765 A1   7/2020  Azizi et al.

OTHER PUBLICATIONS

Park et al, "Analysis of spectrum channel assignment for IEEE 802.11b wireless LAN", IEEE, Dec. 16, 2002, ISBN 0-7803-7442-8 (Year: 2002).*
International Search Report and Written Opinion of the International Searching Authority dated Nov. 24, 2021 in International (PCT) Application No. PCT/US2021/044332.
Lakdawala, Hasnain et al., "A 32 nm SoC With Dual Core ATOM Processor and RF WiFi Transceiver", IEEE Journal of Solid-State Circuits, vol. 48, No. 1, Jan. 2013, pp. 91-103, XP011485462.
International Preliminary Report on Patentability dated Feb. 7, 2023 in International (PCT) Application No. PCT/US2021/044332.

* cited by examiner

| | 1214 Protocol | 1204 TCP | 1206 TCP | 1208 TCP | 1210 TCP | 1212 UDP |
|---|---|---|---|---|---|---|
| 1216 | FlowCount 1Gbe Ports | 1x 2 ports | 1x 3 ports | 1x 3 ports | 10x 3 ports | 1x 3 ports |
| 1218 | Flow Count 2.5Gbe | 1x | 1x | 10x | 10x | 1x |
| 1220 | Net_DDR1600 | 3734 | 3878 | 3890 | 3813 | 4144 |
| 1222 | NET_DDR1067 | 3861 | 3891 | 3895 | 3793 | 4147 |

| | Downstream 1308 | | | Upstream 1310 | | |
|---|---|---|---|---|---|---|
| | 2x2 | 3x3 | 4x4 | 2x2 | 3x3 | 4x4 |
| 1302 DDR1600 | 1575 | 2064 | 2931 | 1580 | 2078 | 2951 |
| 1304 DDR1067 | 1575 | 2064 | 2931 | 1576 | 2075 | 2947 |
| | 1312 | 1314 | 1316 | 1318 | 1320 | 1322 |

|  | Product A Production (64-bit @ 800 MHz) | | Product A Cost-Reduction (32-bit @ 800 MHz) | | Product A Cost-Reduction (32-bit @ 533 MHz) | |
|---|---|---|---|---|---|---|
| Data rates | DS | US | DS | US | DS | US |
| Total: | 2.10Gbps | 156Mbps | 2.07Gbps | 137Mbps | 2.10Gbps | 150Mbps |
| Ethernet | 944 | 59 | 941 | 47 | 933 | 54 |
| 2.4G | 142 | 30 | 100 | 28 | 115 | 30 |
| 5G | 703 | 15 | 711 | 15 | 725 | 15 |
| Ethernet 2 | 310 | 52 | 313 | 47 | 326 | 51 |
| Unit internal temperatures | | | | | | |
| PUMA Temp | 89C | | 90C | | 91C | |
| 24G Temp | 74C | | 74C | | 79C | |
| 5G Temp | 86C | | 89C | | 93C | |
| Zone 0 | 90C | | 91C | | 93C | |
| Zone 1 | 90C | | 91C | | 93C | |
| Zone 2 | 89C | | 89C | | 92C | |

GATEWAY DEVICE WITH CLOCK SPEED THAT REDUCES ELECTRO-MAGNETIC NOISE

BACKGROUND

Embodiments of the disclosure relate to noise reduction in a wireless network device.

SUMMARY

Aspects of the present disclosure are drawn to a network device including: a radio configured to operate in a 2.4 GHz Wi-Fi band; a 32 bit double data rate (DDR) memory having instructions stored therein; a system clock configured to operate at 533 MHz; and a processor configured to execute the instructions stored on the memory to cause the network device to: operate the 32 bit DDR memory at 1067 MHz; instruct the radio to transmit data to be transmitted in the 2.4 GHz Wi-Fi band; and instruct the radio to receive data to be received in the 2.4 GHz Wi-Fi band.

In some embodiments, the 32 bit DDR memory is additionally configurable to operate at 1600 MHz with a second system clock configured to operate at 800 MHz.

In some embodiments, the network device may be a gateway.

In some embodiments, the network device may be a router.

Other aspects of the present disclosure are drawn to a method of using a network device, wherein the method includes: operating a system clock at 533 MHz; operating, via a processor configured to execute instructions stored on a 32 bit double data rate (DDR) memory, the 32 bit DDR memory at 1067 MHz; instructing, via the processor, a radio to transmit data to be transmitted in a 2.4 GHz Wi-Fi band; and instructing, via the processor, the radio to receive data to be received in the 2.4 GHz Wi-Fi band.

In some embodiments, the 32 bit DDR memory is additionally configurable to operate at 1600 MHz with a second system clock configured to operate at 800 MHz.

In some embodiments, the network device may be a gateway.

In some embodiments, the network device may be a router.

Other aspects of the present disclosure are drawn to a non-transitory, computer-readable media having computer-readable instructions stored thereon, the computer-readable instructions being capable of being read by a network device, wherein the computer-readable instructions are capable of instructing the network device to perform the method including: operating a system clock at 533 MHz; operating, via a processor configured to execute instructions stored on a 32 bit double data rate (DDR) memory, the 32 bit DDR memory at 1067 MHz; instructing, via the processor, a radio to transmit data to be transmitted in a 2.4 GHz Wi-Fi band; and instructing, via the processor, the radio to receive data to be received in the 2.4 GHz Wi-Fi band.

In some embodiments, the computer-readable instructions are capable of instructing the network device to perform the method wherein the 32 bit DDR memory is additionally configurable to operate at 1600 MHz with a second system clock configured to operate at 800 MHz.

In some embodiments, the computer-readable instructions are capable of instructing the network device to perform the method wherein the network device may be a gateway.

In some embodiments, the computer-readable instructions are capable of instructing the network device to perform the method wherein the network device may be a router.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 12 illustrates a chart of Data Over Cable Service Interface Specification (DOC SIS) to Ethernet downstream results;

FIG. 13 illustrates a chart of Wi-Fi throughput results;

FIG. 14 illustrates a chart of thermal test results;

DETAILED DESCRIPTION

Gateway devices are devices that include a modem, a network access point, and a router. For example, a gateway device may include a modem (e.g., cable modem), and router with wired networking circuitry (e.g., Ethernet, MoCA) and Wireless Local Area Network (WLAN) communication circuitry (e.g., Wi-Fi), as well as associated circuitry such as memories. Gateway devices generally require a lot of sheet metal shielding, e.g., copper shielding, in order to reduce interference among components and interference with other devices. Chipsets for gateway devices often integrally include circuitry for modem functionality as well as circuitry for local area networking including WLAN (e.g., Wi-Fi). The chipset in a gateway device emits a lot of electro-magnetic noise (hereafter sometimes referred to simply as noise) during operation. Disclosed herein are techniques for lowering such noise and thereby reducing the need for, or amount of, sheet metal shielding.

The chipset in a gateway device often includes a Double Data Rate (DDR) memory, such as Double Data Rate Synchronous Dynamic Random Access Memory (DDR SDRAM). The double data rate means that the memory is able to operate on a double data rate for each cycle. For example, for a 533 MHz clock of the chipset, the data rate out of the DDR is 1067 MHz, and likewise, for an 800 MHz clock, the data rate out of the DDR is 1600 MHz. This concept is often abbreviated as DDR-1067 and DDR-1600, etc.

DDR memories exhibit electro-magnetic noise (measured in dB) during operation. When the chipset in the gateway device also includes circuitry for wireless communication, such as Wi-Fi, the noise generated by the memory can cause interference with the wireless communication and a corresponding lowering of throughput in the wireless communication.

Many chipsets used in gateway devices have a pedigree beginning in the past for use in modems, and today have been further developed into chipsets for use in gateway devices that include wired and wireless routers. However, as discussed in detail below, the operating frequency of some such chipsets cause noise that is surprisingly focused in the 2.4 GHz Wi-Fi band.

The hardware configurations disclosed herein reduce the DDR memory noise, and improve the wireless communication throughput without causing any degradation in performance of the memory or communication hardware without use of sheet metal shielding. While sheet metal shielding may still be used, the configurations disclosed herein reduce the electro-magnetic noise and interference caused by the memory in their own right.

In the past, gateway devices often included a 64 bit DDR memory. This will be described in greater detail with reference to FIGS. 1-2.

Figure 1:
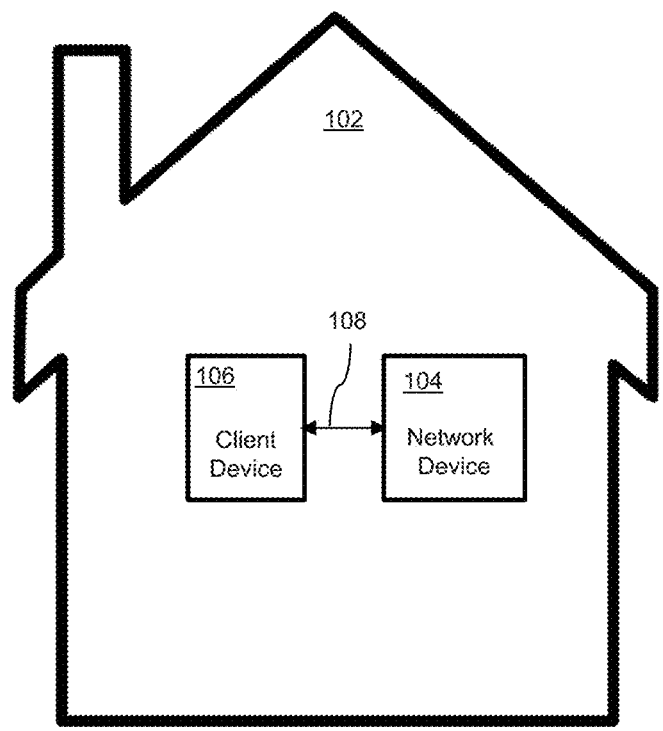
FIG. 1 illustrates a prior art Wi-Fi communication system within a residence.

FIG. 1 illustrates a prior art Wi-Fi communication system within a residence 102. As shown in the figure, the prior art Wi-Fi communication system includes a network device 104 and a client device 106.

Network device 104 is configured to wirelessly communicate with client device 106 over a wireless communication channel 108. In this example, network device 104 is a gateway that is able to wirelessly communicate with client device 106 over the 2.4 GHz Wi-Fi band.

Figure 2:
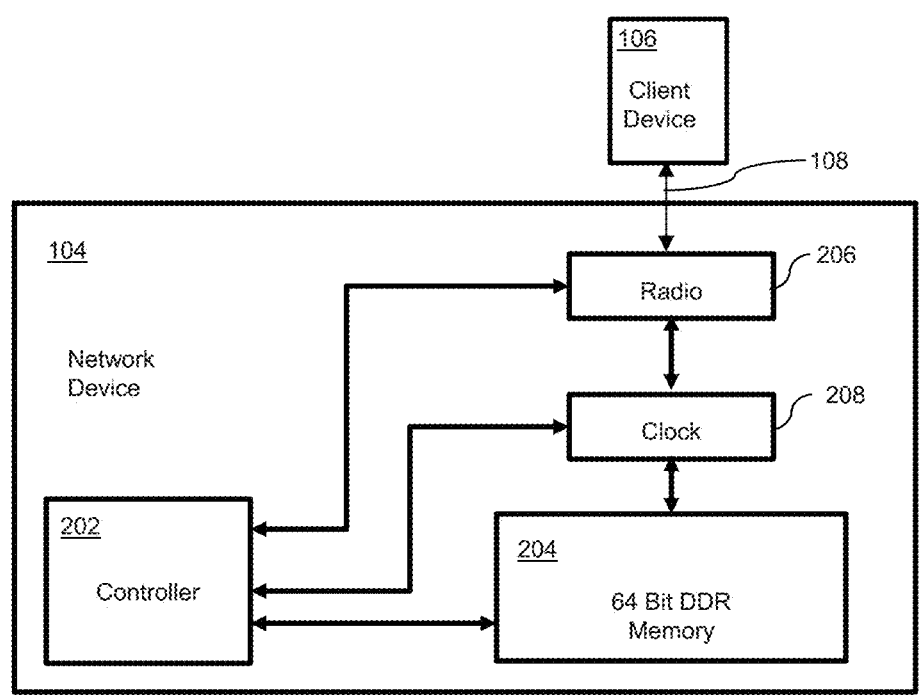
FIG. 2 illustrates the client device and an exploded view of the network device of the prior art Wi-Fi communication system of FIG. 1.

FIG. 2 illustrates client device 106 and an exploded view of network device 104. As shown in the figure, network device 104 includes a controller 202, a 64 bit double data rate (DDR) memory 204, a radio 206 and a clock 208.

Controller 202 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of network device 104 in accordance with the embodiments described in the present disclosure.

64 bit DDR memory 204 can store various programming, and user content, and data.

Radio 206 may include a WLAN interface radio transceiver that is operable to communicate with client device 106. Radio 206 includes one or more antennas and communicates wirelessly via one or more of the 2.4 GHz band, 5 GHz band, 6 GHz band, and 60 GHz band, or at the appropriate band and bandwidth to implement any IEEE 802.11 Wi-Fi protocols, such as the Wi-Fi 4, 5, 6, or 6E protocols. Radio 206 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol. In this example, radio 206 operates in the 2.4 GHz band.

Clock 208 provides an operating clock signal for controller 202, radio 206 and 64 bit DDR memory 204. In this example, clock 208 provides an 800 MHz clock signal. As such, 64 bit DDR memory 204 operates at 1600 MHz.

Thereafter, through technical developments, gateway devices were able to achieve comparable performance using a 32 bit DDR memory, which is less expensive than 64 bit DDR memory. This will be described in greater detail with reference to FIGS. 3-4.

Figure 3:
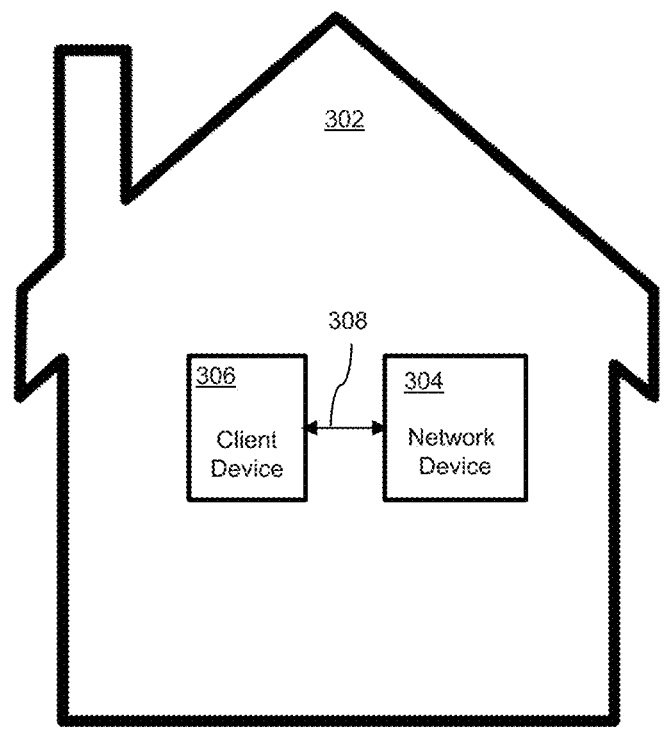
FIG. 3 illustrates another prior art Wi-Fi communication system within a residence.

FIG. 3 illustrates another prior art Wi-Fi communication system within a residence 302. As shown in the figure, the prior art Wi-Fi communication system includes a network device 304 and a client device 306.

Network device 304 is configured to wirelessly communicate with client device 306 over a wireless communication channel 308. In this example, network device 304 is a gateway that is able to wirelessly communicate with client device 306 over the 2.4 GHz Wi-Fi band.

Figure 4:
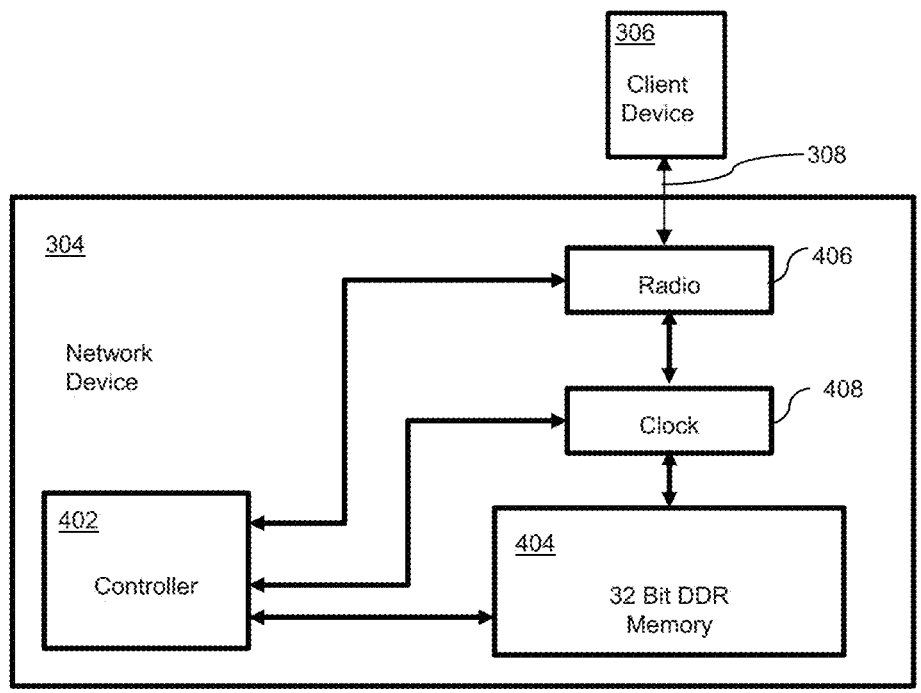
FIG. 4 illustrates the client device and an exploded view of the network device of the prior art Wi-Fi communication system of FIG. 3.

FIG. 4 illustrates client device 306 and an exploded view of network device 304. As shown in the figure, network device 304 includes a controller 402, a 32 bit DDR memory 404, a radio 406 and a clock 408. The system disclosed in FIGS. 3-4 differs from the system disclosed in FIGS. 1-2 in that the system disclosed in FIGS. 3-4 uses a 32 bit DDR memory as opposed to the 64 bit DDR memory in FIGS. 1-2.

Controller 402 may be implemented as a hardware processor such as a microprocessor, a multi-core processor, a single core processor, a FPGA, a microcontroller, an ASIC, a DSP, or other similar processing device capable of executing any type of instructions, algorithms, or software for controlling the operation and functions of network device 304 in accordance with the embodiments described in the present disclosure.

32 bit DDR memory 404 can store various programming, and user content, and data. 32 bit DDR memory 404 operates at 1600 MHz, in a manner similar to 64 bit DDR memory 204 discussed above with reference to FIG. 2.

Radio 406 may include a WLAN interface radio transceiver that is operable to communicate with client device 306. Radio 406 includes one or more antennas and communicates wirelessly via one or more of the 2.4 GHz band, 5 GHz band, 6 GHz band, and 60 GHz band, or at the appropriate band and bandwidth to implement any IEEE 802.11 Wi-Fi protocols, such as the Wi-Fi 4, 5, 6, or 6E protocols. Radio 406 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol. In this example, radio 406 operates in the 2.4 GHz band.

Clock 408 provides an operating clock signal for controller 402, radio 406 and 32 bit DDR memory 404. In this example, clock 408 provides an 800 MHz clock signal. As such, 32 bit DDR memory 404 operates at 1600 MHz.

It should be noted that a 32 bit DDR memory, and the memory bus, is more active than a 64 bit DDR memory and bus, which results in a higher amount of noise. In other words, with a 32 bit DDR memory, compared to a 64 bit DDR memory, the bus is more active in getting the data back and forth between the processor and the DDR memory. This additional activity creates more noise. Of course, a 64 bit DDR memory and bus also have this type of noise as well, but the 32 bit DDR memory and bus exhibit relatively more noise compared to a 64 bit DDR memory and bus.

As discussed above, gateway chipsets often include Wi-Fi circuitry. Wi-Fi communications utilize several frequency bands, including what is referred to as the 2.4 GHz band (i.e., from around 2.4 GHz to 2.4835 GHz) including plural channels across the band. The clock speed used in the chipsets of many gateway devices is approximately 800 MHz. The third harmonic of 800 MHz is 2.4 GHz. Further, this third harmonic is a relatively powerful harmonic. Thus, the third harmonic, 2.4 GHz, of the 800 MHz chipset clock, falls into the 2.4 GHz Wi-Fi communication band. This interference from the third harmonic causes degradation on the order of multiple decibels in communication signals in the channels of the 2.4 GHz band. The degradation is worse on the lower channels in the 2.4 GHz band, but all channels are negatively affected to some degree. This will be described in greater detail with reference to FIG. 5.

Figure 5:
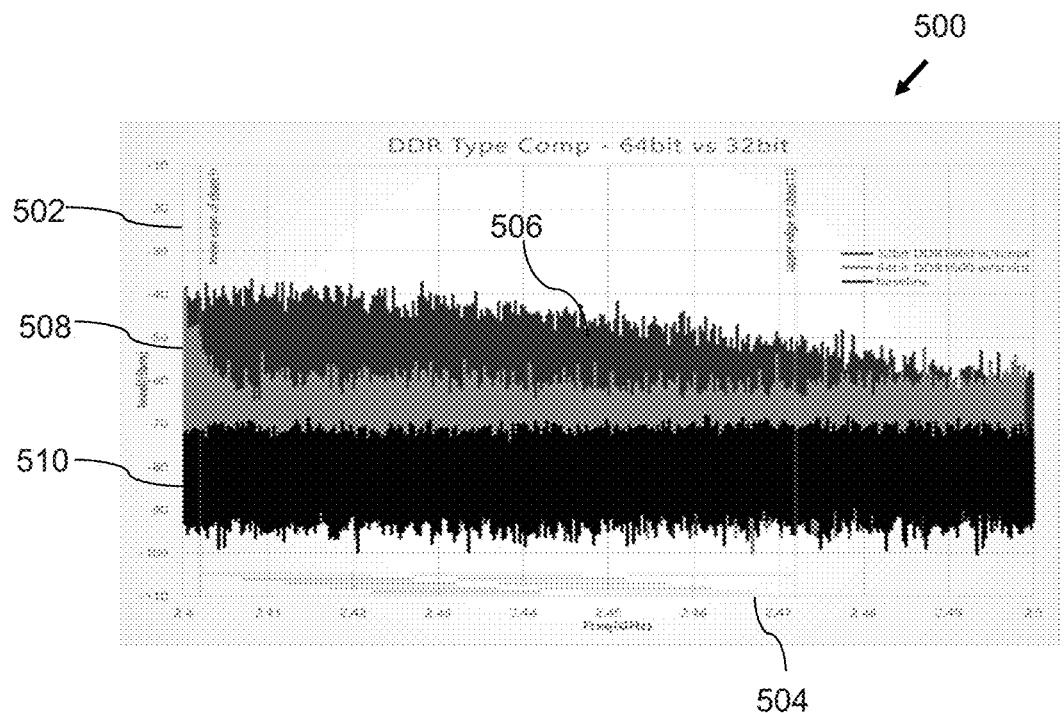
FIG. 5 illustrates a graph of noise of prior art gateway devices.

FIG. 5 illustrates a graph 500 of noise of DDR memories of prior art gateway devices. As shown in the figure, graph 500 includes a Y-axis 502, an X-axis 504, a function 506, a function 508 and a function 510. Y-axis 502 represents noise measured in −dBm, which is the power ratio in decibels (dB) of the measured power of the noise reference to one milliwatt. X-axis 504 represents frequency measured in GHz. Function 506 represents the noise generated by a 32 bit DDR memory operated at a 1600 MHz clock. Function 508 represents the noise generated by a 64 bit DDR memory operated at a 1600 MHz clock. Function 510 represents the noise floor.

By comparing function 506 with function 508, FIG. 5 clearly highlights the discrepancy between the two variants. In particular, the gateway device with an 800 MHz clock and 32 bit DDR (DDR1600) exhibits higher noise than the gateway device with an 800 MHz clock and 64 bit DDR (DDR1600) in the 2.4 GHz Wi-Fi band (e.g., 2.4 GHz to 2.48 GHz).

The use of a 32 bit DDR memory allows a cost reduction as opposed to a 64 bit DDR memory, but also results in more noise which requires more shielding. This will be described in greater detail with reference to FIG. 6.

Figure 6:
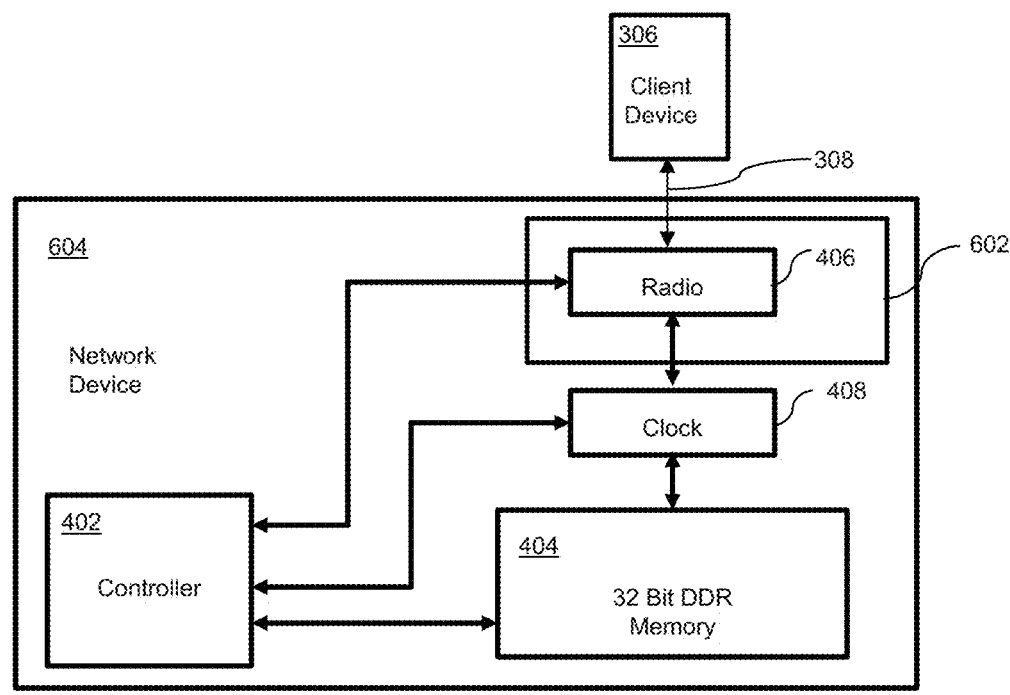
FIG. 6 illustrates the client device of FIG. 3 and an exploded view of another prior art network device.

FIG. 6 illustrates the client device of FIG. 3 and an exploded view of another prior art network device 604.

As shown in the figure, network device 604 includes controller 402, 32 bit DDR memory 404, radio 406, shielding 602, and clock 408. The system disclosed in FIG. 6 differs from the system disclosed in FIG. 4 in that the system disclosed in FIG. 6 includes shielding 602.

Shielding 602 decreases interference between signals transmitted from/received by radio 406 in the 2.4 GHz band and the third harmonic derived from the 1600 MHz signal driving 32 bit DDR memory 404. In this example, shielding is illustrated as surrounding radio 406. However, in some examples, a shielding may alternatively surround 32 bit DDR memory 404. Further, in some examples, a shielding may merely be disposed between radio 406 and 32 bit DDR memory 404.

Shielding adds to the cost of manufacturing a gateway device and negatively impacts the cost savings of using the 32 bit memory and bus.

What is needed is a system and method for reducing noise from a 32 bit DDR in network device transmitting in the 2.4 GHz Wi-Fi band without introducing additional shielding.

A system and method in accordance with the present disclosure reduces noise from a 32 bit DDR in network device transmitting in the 2.4 GHz Wi-Fi band without introducing additional shielding.

In accordance with the present disclosure, in order to reduce the noise of the 32 bit DDR in the 2.4 Gz Wi-Fi band, the clock frequency of the gateway device with the 32 bit DDR is lowered in a manner that the band, 2.4 GHz to 2.48 GHz, is not impacted, but rather falls between, the harmonics of the clock. In a non-limiting example embodiment, the 32 bit DDR is operated at 1067 MHz as opposed to the 1600 MHz as in the prior art as discussed above with reference to FIGS. 2-6.

An example method of operating a 32 bit DDR in the 2.4 Gz Wi-Fi band in accordance with aspects of the present disclosure will now be described in greater detail with reference to FIGS. 7-16C.

Figure 7:
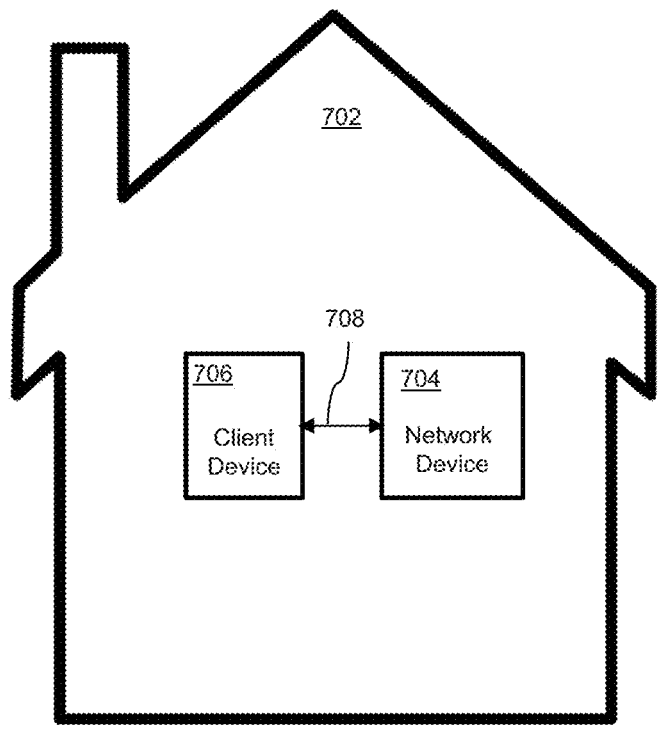
FIG. 7 illustrates an example Wi-Fi communication system within a residence, in accordance with aspects of the present disclosure.

FIG. 7 illustrates an example Wi-Fi communication system within a residence 702, in accordance with aspects of the present disclosure.

As shown in the figure, the Wi-Fi communication system includes a network device 704 and a client device 706.

Network device 704 is configured to wirelessly communicate with client device 706 over a wireless communication channel 708. In this example, network device 704 is a gateway that is able to wirelessly communicate with client device 706 over the 2.4 GHz Wi-Fi band.

Figure 8:
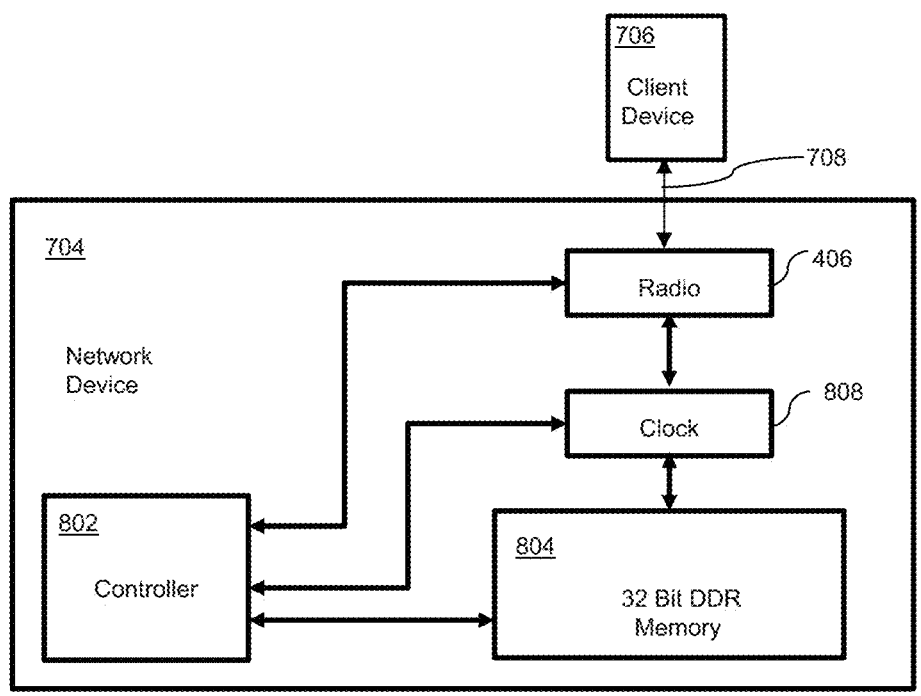
FIG. 8 illustrates the client device and an exploded view of the network device of the Wi-Fi communication system of FIG. 7.

FIG. 8 illustrates client device 706 and an exploded view of network device 704.

As shown in the figure, network device 704 includes a controller 802, a 32 bit DDR memory 804, radio 406 and a clock 808.

In this example, controller 802, 32 bit DDR memory 804, radio 606 and clock 808 are illustrated as individual devices. However, in some embodiments, at least two of controller 802, 32 bit DDR memory 804, radio 606 and clock 808 may be combined as a unitary device. Further, in some embodiments, at least one of controller 802 and clock 808 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 802 may be implemented as a hardware processor such as a microprocessor, a multi-core processor, a single core processor, a FPGA, a microcontroller, an ASIC, a DSP, or other similar processing device capable of executing any type of instructions, algorithms, or software for controlling the operation and functions of network device 304 in accordance with the embodiments described in the present disclosure.

32 bit DDR memory 804 can store various programming, and user content, and data. 32 bit DDR memory 404 operates at 1067 MHz, as opposed to the manner in which 32 bit DDR memory 404 operates as discussed above with reference to FIG. 4. 32 bit DDR memory 804 additionally includes instructions, that when executed by controller 802, enable network device 704 to operate 32 bit DDR memory 804 at 1067 MHz; instruct radio 406 to transmit data to be transmitted in the 2.4 GHz Wi-Fi band; and instruct radio 406 to receive data to be received in the 2.4 GHz Wi-Fi band.

Clock 808 provides an operating clock signal for controller 802, radio 406 and 32 bit DDR memory 804. In accordance with aspects of the present disclosure, clock 808 provides a 533 MHz clock signal. As such, 32 bit DDR memory 804 operates at 1067 MHz. Further, in some embodiments, clock 808 is configurable to alternatively provide an 800 MHz clock signal. However, in such embodiments, 32 bit DDR memory additionally includes instructions, that when executed by controller 802, enable controller 802 to cause clock 808 to provide a 522 MHz clock signal as opposed to the 800 MHz clock signal.

Figure 9:
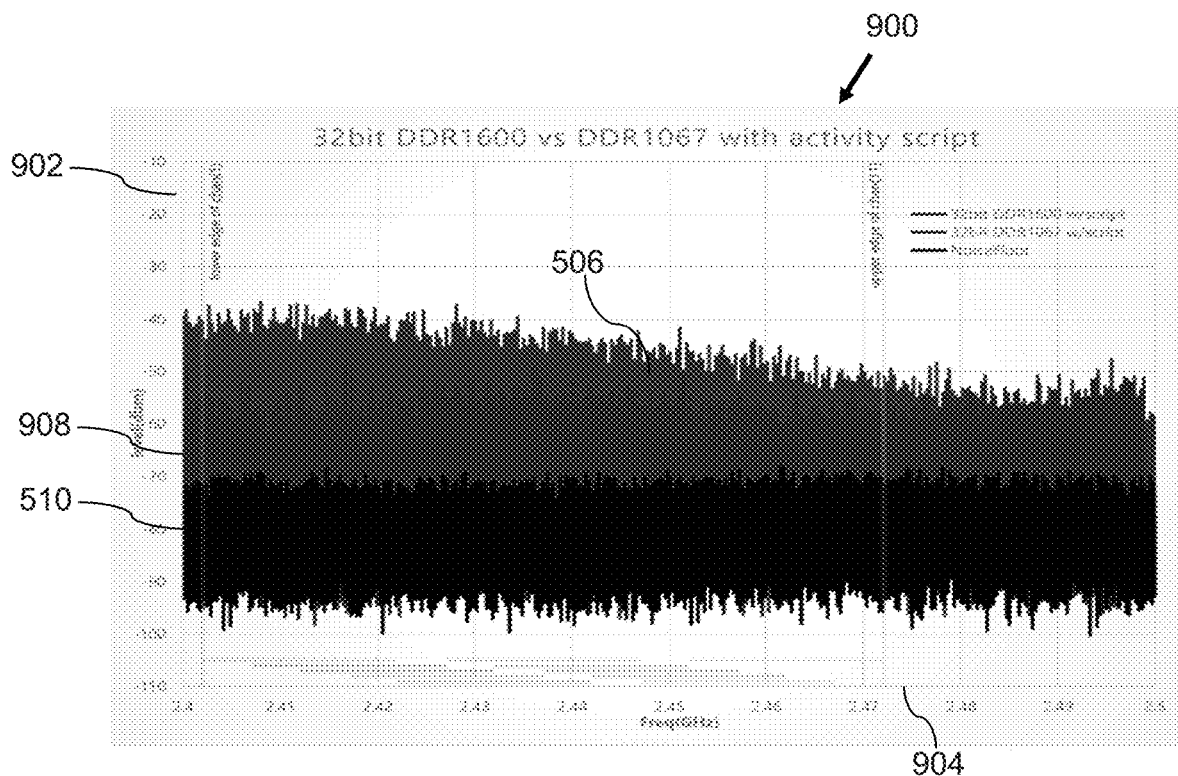
FIG. 9 illustrates a graph of noise of a prior art gateway device and a gateway device in accordance with aspects of the present disclosure.

FIG. 9 illustrates a graph 900 of noise of a prior art gateway device and a gateway device in accordance with aspects of the present disclosure.

As shown in the figure, graph 900 includes a Y-axis 902, an X-axis 904, function 506, a function 908 and function 510. Y-axis 502 represents noise measured in −dBm, which is the power ratio in decibels (dB) of the measured power of the noise reference to one milliwatt. X-axis 904 represents frequency measured in GHz. As discussed above with reference to FIG. 9, function 908 represents the noise generated by a 32 bit DDR memory operated at a 1067 MHz clock. As mentioned above with reference to FIG. 5, function 508 represents the noise generated by a 64 bit DDR memory operated at a 1600 MHz clock. Further, as mentioned above with reference to FIG. 5, function 510 represents the noise floor.

By comparing function 506 with function 908, FIG. 9 clearly shows that running a 32 bit DDR memory at a 533 MHz clock speed greatly reduces the noise levels in the 2.4 GHz Wi-Fi band, i.e., 2.4 GHz to 2.48 GHz. In particular, a gateway device with an 533 MHz clock and 32 bit DDR (DDR1067) exhibits around 15 to 20 dB less noise than a gateway device with an 800 MHz clock and 32 bit DDR (DDR1600).

Figure 10:
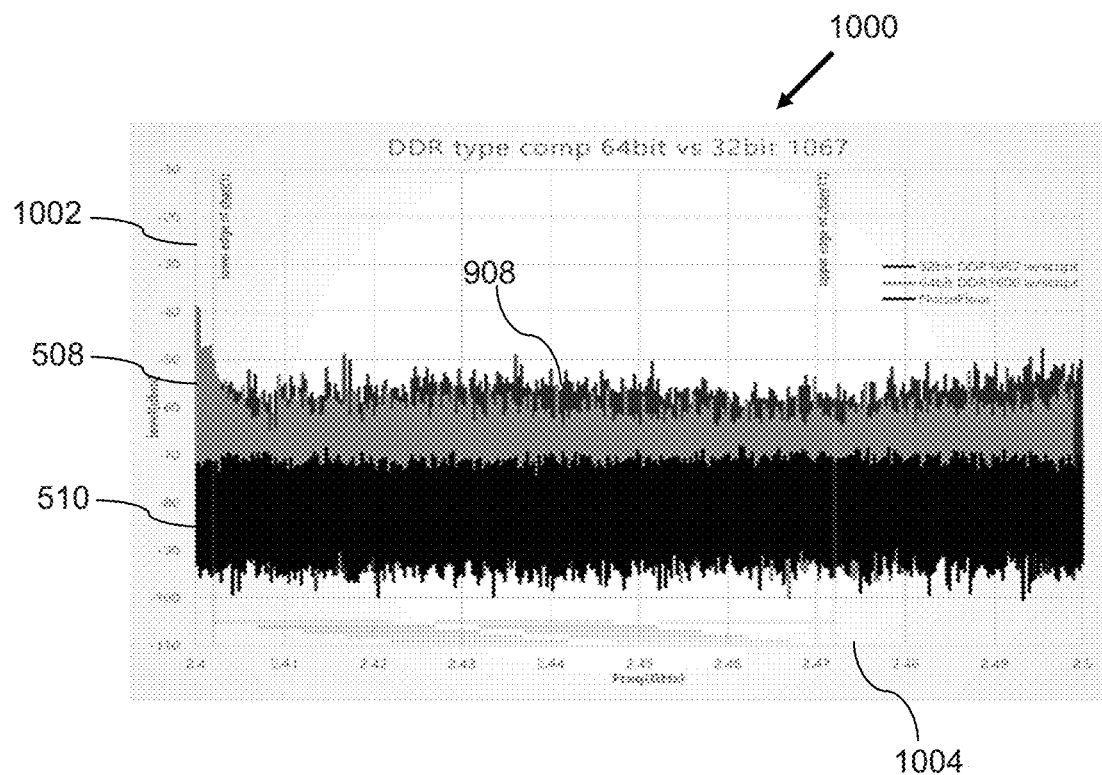
FIG. 10 illustrates another graph of noise of a prior art gateway device and a gateway device in accordance with aspects of the present disclosure.

FIG. 10 illustrates a graph 1000 of noise of a prior art gateway device and a gateway device in accordance with aspects of the present disclosure.

As shown in the figure, graph 1000 includes a Y-axis 1002, an X-axis 1004, function 508, function 908 and function 510. Y-axis 1002 represents noise measured in −dBm, which is the power ratio in decibels (dB) of the measured power of the noise reference to one milliwatt. X-axis 1004 represents frequency measured in GHz. As discussed above with reference to FIG. 5, function 506 represents the noise generated by a 32 bit DDR memory operated at a 1600 MHz clock. Function 908 represents the noise generated by a 32 bit DDR memory operated at a 1067 MHz clock. Further, as mentioned above with reference to FIG. 5, function 510 represents the noise floor.

FIG. 10 shows the difference, and similarity, between gateway device with an 800 MHz clock and 64 bit DDR (DDR1600) and a gateway device with a 533 MHz clock and 32 bit DDR (DDR1067). By comparing function 908 with function 508, FIG. 10 clearly shows that the gateway device with an 533 MHz clock and 32 bit DDR (DDR1067) is comparable to the gateway device with an 800 MHz clock and 64 bit DDR (DDR1600).

By configuring the memory and bus on a gateway device as discussed above, the frequency harmonics of the clock of the DDR memory and bus are moved away from the band of interest, i.e., the 2.4 GHz Wi-Fi band. The clock speed can be configured in the firmware of the chipset, via a bootloader for example.

FIGS. 11A-D shows attenuator test comparisons.

Figure 11A:
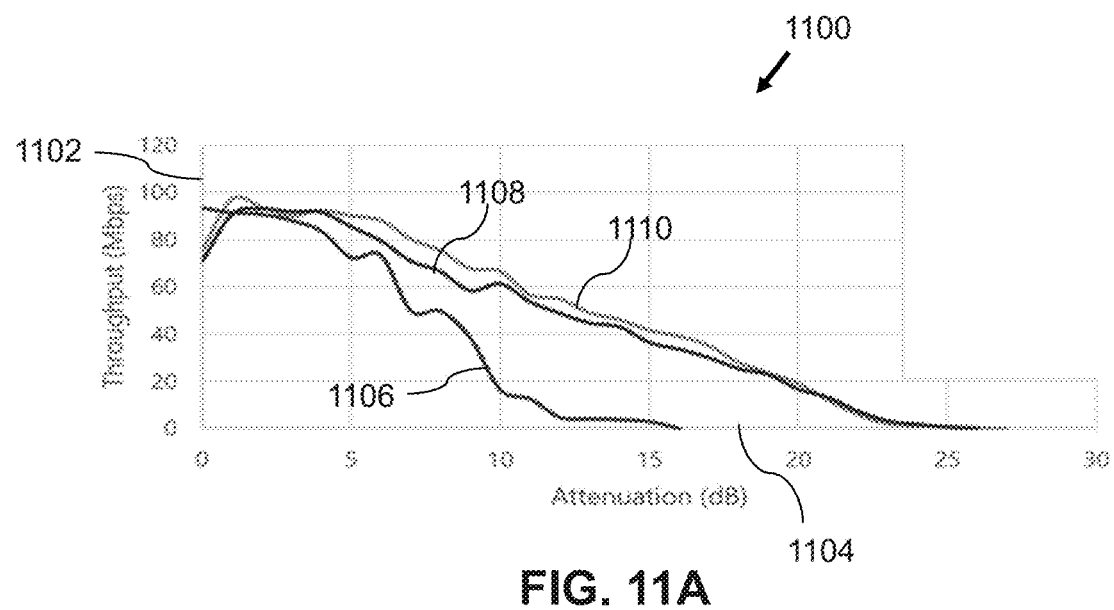
FIG. 11A illustrates a graph of upstream attenuation.

FIG. 11A illustrates a graph 1100 of upstream attenuation.

As shown in the figure, graph 1100 includes a Y-axis 1102, an X-axis 1104, a function 1106, a function 1108 and a function 1110. Y-axis 1002 represents throughput of upstream data measured in megabits per second (Mbps). X-axis 1004 represents attenuation of the upstream data measured in decibels (dB). Function 1106 represents wireless communication data throughput from a gateway device, operating with an 800 MHz clock and having a 32 bit DDR, to a client device over a range of attenuations. Function 1108 represents wireless communication data throughput from a gateway device, operating with a 533 MHz clock and having a 32 bit DDR, to a client device over a range of attenuations. Function 1110 represents wireless communication data throughput from a gateway device, operating with an 800 MHz clock and having a 64 bit DDR, to a client device over a range of attenuations.

Figure 11B:
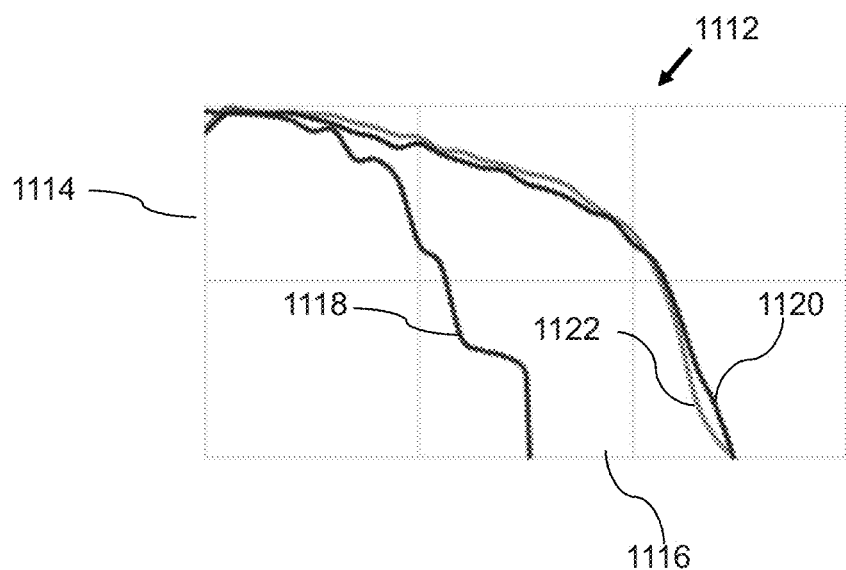
FIG. 11B illustrates a graph of upstream attenuation in a logarithmic scale.

FIG. 11B illustrates a graph 1112 of upstream attenuation in a logarithmic scale.

As shown in the figure, graph 1112 includes a Y-axis 1114, an X-axis 1116, a function 1118, a function 1120 and a function 1122. Y-axis 1114 represents a log scale of throughput of upstream data from graph 1100 of FIG. 11A. X-axis 1116 represents a log scale of attenuation of the upstream data from graph 1100. Function 1118 represents the log-scale of function 1106 from graph 1100. Function 1120 represents the log-scale of function 1108 from graph 1100. Function 1122 represents the log-scale of function 1110 from graph 1100.

Figure 11C:
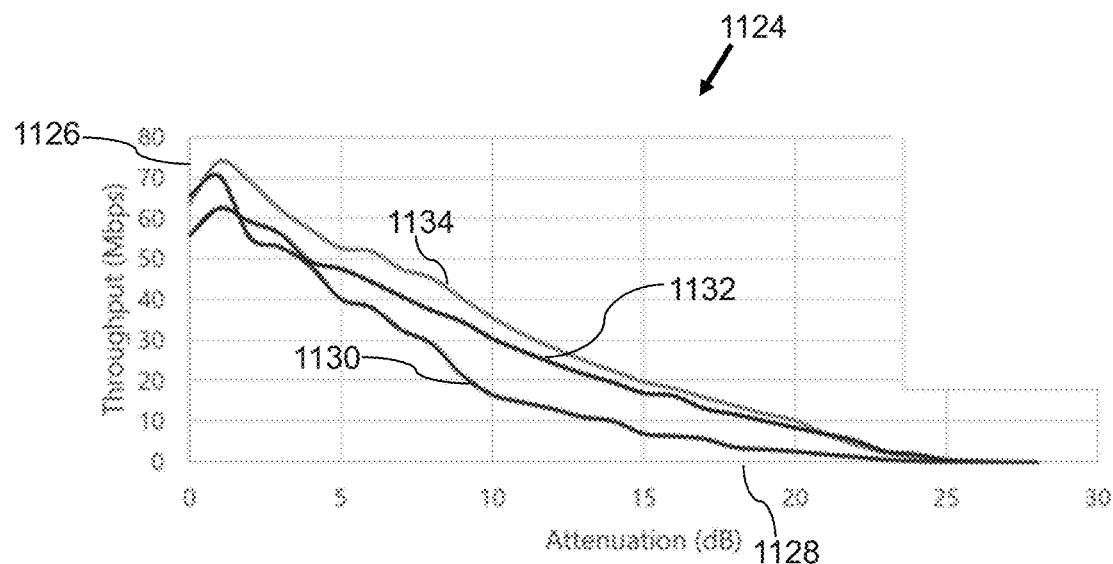
FIG. 11C illustrates a graph of downstream attenuation.

FIG. 11C illustrates a graph of downstream attenuation.

As shown in the figure, graph 1124 includes a Y-axis 1126, an X-axis 1128, a function 1130, a function 1132 and a function 1134. Y-axis 1126 represents throughput of downstream data measured in megabits per second (Mbps). X-axis 1128 represents attenuation of the downstream data measured in decibels (dB). Function 1130 represents wireless communication data throughput from a gateway device, operating with an 800 MHz clock and having a 32 bit DDR, to a client device over a range of attenuations. Function 1132 represents wireless communication data throughput from a gateway device, operating with a 533 MHz clock and having a 32 bit DDR, to a client device over a range of attenuations. Function 1134 represents wireless communication data throughput from a gateway device, operating with an 800 MHz clock and having a 64 bit DDR, to a client device over a range of attenuations.

Figure 11D:
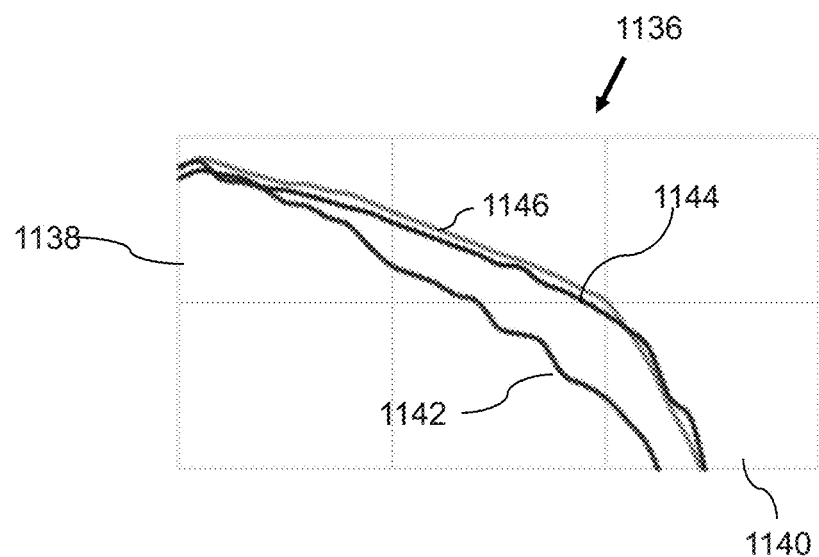
FIG. 11D illustrates a graph of downstream attenuation in a logarithmic scale.

FIG. 11D illustrates a graph 1136 of downstream attenuation in a logarithmic scale.

As shown in the figure, graph 1136 includes a Y-axis 1138, an X-axis 1140, a function 1142, a function 1144 and a function 1146. Y-axis 1138 represents a log scale of throughput of upstream data from graph 1124 of FIG. 11A. X-axis 1140 represents a log scale of attenuation of the upstream data from graph 1124. Function 1142 represents the log-scale of function 1130 from graph 1124. Function 1144 represents the log-scale of function 1132 from graph 1124. Function 1146 represents the log-scale of function 1134 from graph 1124.

In FIGS. 11A-D, each trace represents wireless communication data throughput from the gateway device to a client device over a range of attenuations. The attenuator test was completed in a Wi-Fi test house setting, at a distant location (~52 feet away). Attenuation was then added to the client device and adjusted to take the readings. The gateway device having a 64 bit DDR running with an 800 MHz clock (corresponding to function 1110 in FIG. 11A, function 1122 in FIG. 11B, function 1134 in FIG. 11C, and function 1146 in FIG. 11D) greatly outperformed the gateway device having a 32 bit DDR running with an 800 MHz clock (corresponding to function 1106 in FIG. 11A, function 1118 in FIG. 11B, function 1130 in FIG. 11C, and function 1142 in FIG. 11D). However, the gateway device with a 533 MHz clock and 32 bit DDR (DDR1067) (corresponding to function 1108 in FIG. 11A, function 1120 in FIG. 11B, function 1132 in FIG. 11C, and function 1144 in FIG. 11D) exhibits performance similar to the gateway device with an 800 MHz clock and 64 bit DDR (DDR1600)(corresponding to function 1110 in FIG. 11A, function 1122 in FIG. 11B, function 1134 in FIG. 11C, and function 1146 in FIG. 11D).

As can be seen in FIG. 11A-D, as the attenuation is increased the gateway device with an 800 MHz clock and 32 bit DDR (DDR1600)(corresponding to function 1106 in FIG. 11A, function 1118 in FIG. 11B, function 1130 in FIG. 11C, and function 1142 in FIG. 11D) drops off rather quickly. Consider a data throughput requirement of 20 Mbps. At 10 dB of attenuation the gateway device with an 800 MHz clock and 32 bit DDR (DDR1600) fails to provide the 20 Mbps of throughput. However, the gateway device with a 533 MHz clock and 32 bit DDR (DDR1067)(corresponding to function 1108 in FIG. 11A, function 1120 in FIG. 11B, function 1132 in FIG. 11C, and function 1144 in FIG. 11D) can provide the 20 Mbps at nearly 20 dB of attenuation. Thus, a system in accordance with the present disclosure allows in this example a nearly 10 dB increase in attenuation that can be handled by the gateway device. Such an increase in attenuation handling ability represents the ability to use the Wi-Fi in an additional room in a house, beyond the available range without the improvement.

Moreover, in addition to the above benefits, the solution disclosed herein does not adversely affect other performance parameters of the gateway device.

FIG. 12 illustrates a chart 1200 of Data Over Cable Service Interface Specification (DOCSIS) to Ethernet downstream results.

As shown in the figure, chart 1200 includes columns 1204, 1206, 1208, 1210, and rows 1214, 1216, 1218, 1220 and 1222. Columns 1204, 1206, 1208, and 1210 are for TCP protocols, whereas column 1212 is for a UDP protocol. Row 1214 lists protocols of chart 1200. Row 1216 lists the flow count for one gigabit ethernet (Gbe) port. Row 1218 lists the flow count for 2.5 Gbe port. Row 1220 lists the DOCSIS to Ethernet downstream results for an 800 MHz clock, with a DDR operating at 1600 MHz. Row 1222 lists the DOCSIS to Ethernet downstream results for a 533 MHz clock, with a DDR operating at 1067 MHz.

The results within chart 1200 are comparable between the two DDR clock speeds (800 MHz clock (DDR1600) and 533 MHz clock (DDR1067)). All test cases were performed similarly and show only minor differences between the tests.

FIG. 13 illustrates a chart 1300 of Wi-Fi throughput results.

As shown in the figure, chart 1300 includes rows 1302 and 1304, a set of columns 1308 and a set of columns 1310. Row 1302 corresponds to an 800 MHz clock, with a DDR operating at 1600 MHz. Row 1304 corresponds to a 533 MHz clock, with a DDR operating at 1067 MHz. Set of columns 1308 corresponds to downstream communication of Wi-Fi through put from a gateway to a client. Set of columns 1308 includes a column 1312, a column 1314, and a column 1316. Column 1312 corresponds to 2×2 160 MHz radio. Column 1314 corresponds to 3×3 160 MHz radio. Column 1316 corresponds to 4×4 160 MHz radio. Set of columns 1310 corresponds to upstream communication of Wi-Fi through put from the client to the gateway. Set of columns 1310 includes a column 1318, a column 1320, and a column 1322. Column 1318 corresponds to 2×2 160 MHz radio. Column 1320 corresponds to 3×3 160 MHz radio. Column 1322 corresponds to 4×4 160 MHz radio.

Similar to the results within chart 1200 discussed above, the results within chart 1300 are comparable between the two DDR clock speeds (800 MHz clock (DDR1600) and 533 MHz clock (DDR1067)). All test cases were performed similarly and show only minor differences between the tests.

FIG. 14 illustrates a chart 1400 of thermal test results.

As shown in the figure, chart 1400 includes a set of columns 1404, a set of columns 1406, and a set of columns 1408. Set of columns 1404 corresponds to an 800 MHz clock, with a 64 bit DDR operating at 1600 MHz and includes a downstream column 1414 and an upstream column 1416. Set of columns 1406 corresponds to an 800 MHz clock, with a 32 bit DDR operating at 1600 MHz and includes a downstream column 1418 and an upstream column 1420. Set of columns 1408 corresponds to a 533 MHz clock, with a 32 bit DDR operating at 1067 MHz and includes a downstream column 1422 and an upstream column 1424.

Chart 1400 additionally includes a column 1426, a column 1428 and a column 1430. Column 1426 corresponds to the internal temperature of a gateway having an 800 MHz clock, with a 64 bit DDR operating at 1600 MHz. Column 1428 corresponds to the internal temperature of a gateway having an 800 MHz clock, with a 32 bit DDR operating at 1600 MHz. Column 1430 corresponds to the internal temperature of a gateway having a 533 MHz clock, with a 32 bit DDR operating at 1067 MHz.

Chart 1400 additionally includes a group of rows 1410 and a group of rows 1412. Group of rows 1410 corresponds to data rates and includes a data rates row 1432, a total row 1434, an Ethernet row 1436, a 2.4G row 1438, a 5G row 1440, and an Ethernet 2 row 1442. Group of rows 1412 corresponds to the unit internal temperature and includes a PUMA temp row 1444, a 2.4G temp row 1446, a 5G temp row 1448, a Zone 0 row 1450, a Zone 1 row 1452, and a Zone 2 row 1454.

The thermal test setup and use case for was used to compare the three types of units. Three different units were tested. Tests were conducted at 40° C. All three units performed equivalently. It should be noted that Wi-Fi temperatures are a bit higher and likely increased the overall temperature of the system.

Figure 15A:
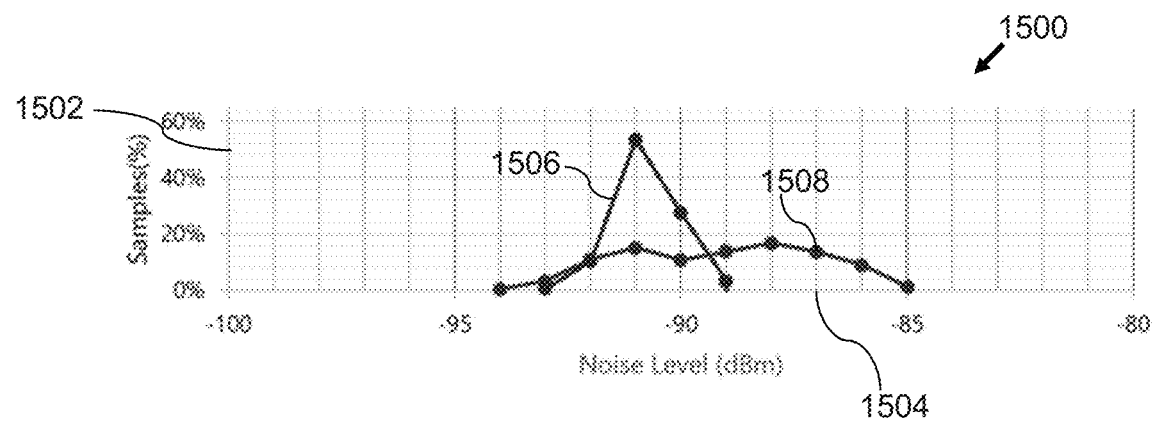
FIGS. 15A-C illustrate antenna scans on three different antennas, respectively.
Figure 15B:
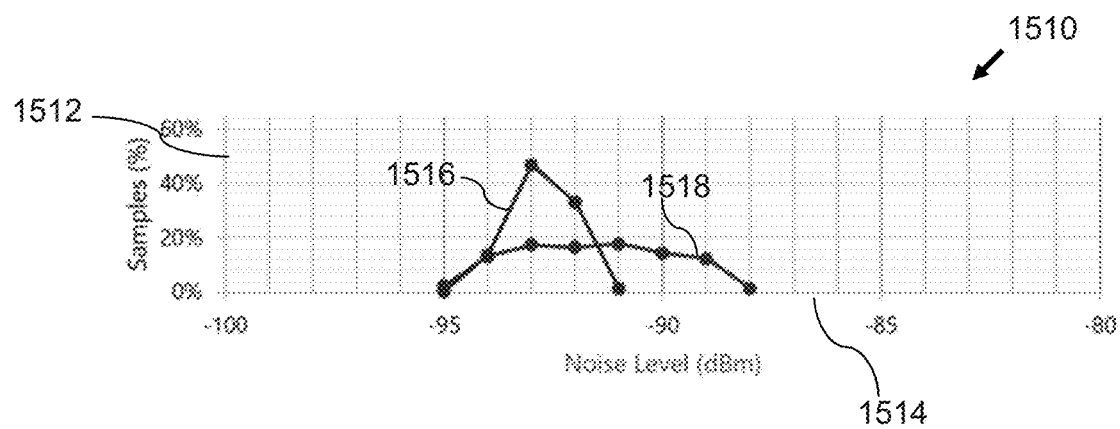
Figure 15C:
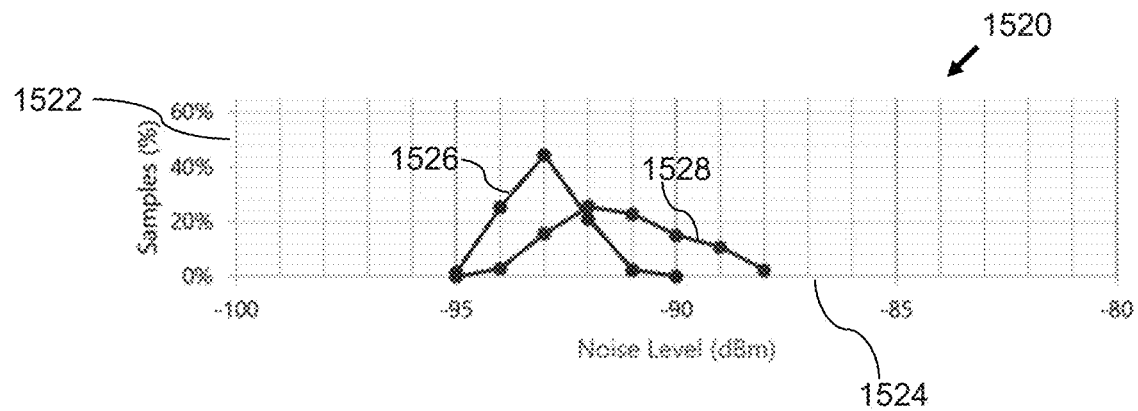

FIGS. 15A-C illustrate antenna scans on three different antennas, respectively.

As shown in FIG. 15A, a graph 1500 includes a Y-axis 1502, an X-axis 1504, a plot 1506 and a plot 1508. Y-axis 1502 represents a percentage of samples, whereas X-axis 1504 is a measure noise level, measure in negative dBM. Plot 1506 corresponds to a 32 bit DDR operating at 1067 MHz. Plot 1508 corresponds to a 32 bit DDR operating at 1600 MHz.

As shown in FIG. 15B, a graph 1510 includes a Y-axis 1512, an X-axis 1514, a plot 1516 and a plot 1518. Y-axis 1512 represents a percentage of samples, whereas X-axis 1514 is a measure noise level, measure in negative dBM. Plot 1516 corresponds to a 32 bit DDR operating at 1067 MHz. Plot 1518 corresponds to a 32 bit DDR operating at 1600 MHz.

As shown in FIG. 15C, a graph 1520 includes a Y-axis 1522, an X-axis 1524, a plot 1526 and a plot 1528. Y-axis 1522 represents a percentage of samples, whereas X-axis 1524 is a measure noise level, measure in negative dBM. Plot 1526 corresponds to a 32 bit DDR operating at 1067 MHz. Plot 1528 corresponds to a 32 bit DDR operating at 1600 MHz.

FIGS. 15A-C show three different antenna scans. Specifically, FIGS. 15A-C show a distribution of the noise collected over a period of time. On all 3 antennas it can be seen that that the gateway device running with an 800 MHz clock (i.e., the DDR at DDR1600) shows an elevated 'bursty' profile. The noise is fairly evenly distributed between −96 dBm and −85 dBm. Changing from 800 MHz to 533 MHz (DDR from DDR1600 to DDR1067) drastically reduces the noise picked up by the antennas, and the noise is more constant with the majority of readings being +/−1 dB of each other.

Figure 16A:
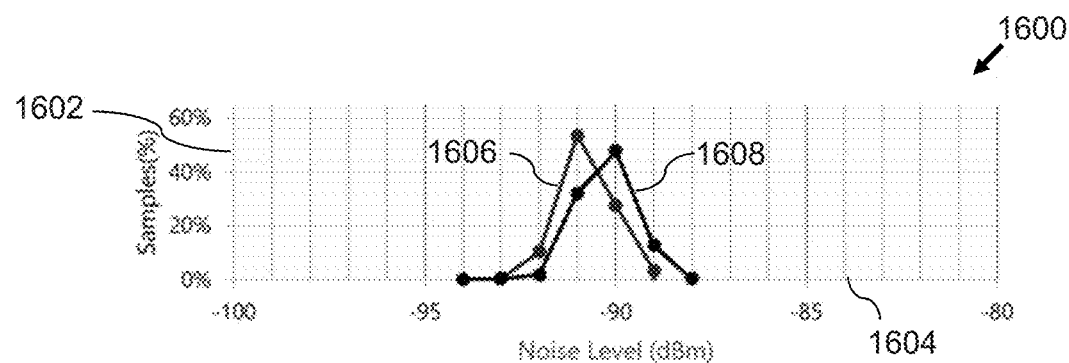
FIGS. 16A-C illustrate additional antenna scans on three different antennas, respectively.
Figure 16B:
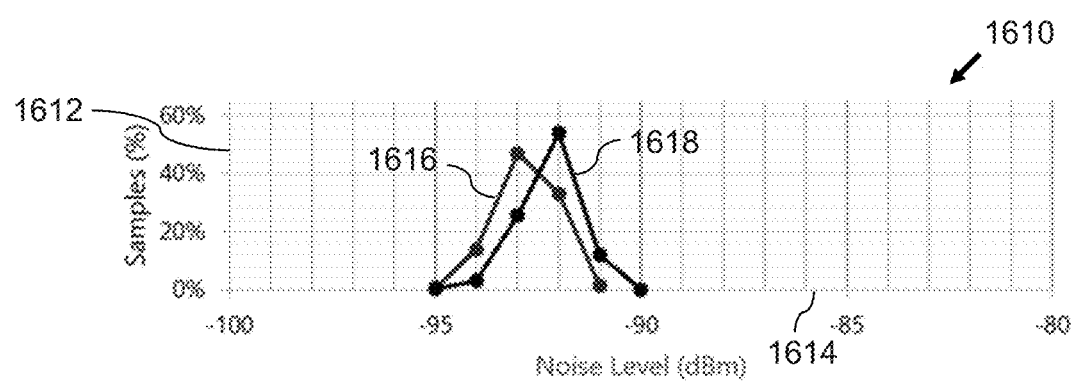
Figure 16C:
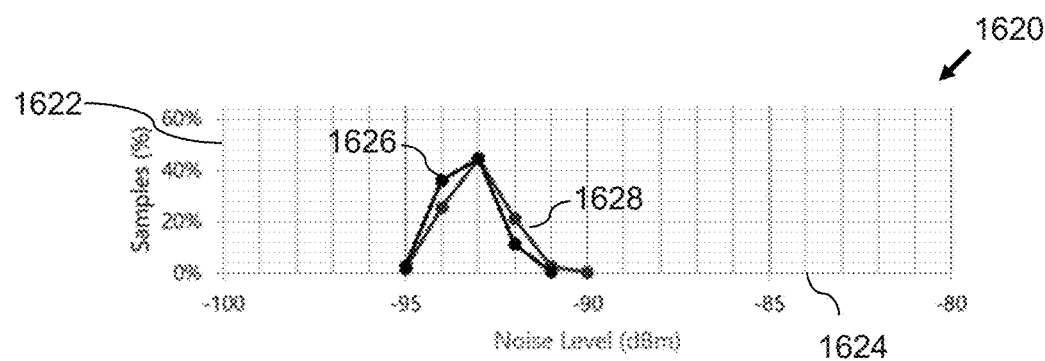

FIGS. 16A-C illustrate additional antenna scans on three different antennas, respectively.

As shown in FIG. 16A, a graph 1600 includes a Y-axis 1602, an X-axis 1604, a plot 1606 and a plot 1608. Y-axis 1602 represents a percentage of samples, whereas X-axis 1604 is a measure noise level, measure in negative dBM. Plot 1606 corresponds to a 32 bit DDR operating at 1067 MHz. Plot 1608 corresponds to a 32 bit DDR operating at 1067 MHz with a load.

As shown in FIG. 16B, a graph 1610 includes a Y-axis 1612, an X-axis 1614, a plot 1616 and a plot 1618. Y-axis 1612 represents a percentage of samples, whereas X-axis 1614 is a measure noise level, measure in negative dBM. Plot 1616 corresponds to a 32 bit DDR operating at 1067 MHz. Plot 1618 corresponds to a 32 bit DDR operating at 1067 MHz with a load.

As shown in FIG. 16C, a graph 1620 includes a Y-axis 1622, an X-axis 1624, a plot 1626 and a plot 1628. Y-axis 1622 represents a percentage of samples, whereas X-axis 1624 is a measure noise level, measure in negative dBM. Plot 1626 corresponds to a 32 bit DDR operating at 1067 MHz. Plot 1628 corresponds to a 32 bit DDR operating at 1067 MHz with a load.

FIGS. 16A-C show three different antenna scans and a distribution of the noise collected over a period of time with the DDR noise script running. The plots in FIGS. 16A-C show that the addition of the DDR noise script hardly shifts the noise profiles when running the gateway device at a 533 MHz clock (DRR at DDR1067).

The above description at times focuses on a gateway device because such a device encompasses a wide consideration of data throughput spanning from data entering the home all the way through to client devices receiving the data via router of the gateway device, including via a wired network (e.g., Ethernet, MoCA) or wireless local area network (WLAN), such as Wi-Fi. However, the concepts disclosed herein also provide improvements to modems without router functionality, and to other electronic devices generally.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gateway device comprising:
   a radio configured to operate in a 2.4 GHz Wi-Fi band to wirelessly communicate with a client device;
   a 32 bit double data rate (DDR) memory having instructions stored therein;
   a system clock configured to operate at a clock frequency of 533 MHz; and
   a processor configured to execute the instructions stored on said memory to cause said gateway device to:
      operate said 32 bit DDR memory at 1067 MHz to fall between harmonics of the system clock;
      provide at least 20 megabits throughput at greater than 10 decibels of attenuation;
      instruct said radio to transmit data to be transmitted in the 2.4 GHz Wi-Fi band that is not impacted by the clock frequency; and
      instruct said radio to receive data to be received in the 2.4 GHz Wi-Fi band that is not impacted by the clock frequency.

2. The gateway device of claim 1, wherein said 32 bit DDR memory is additionally configurable to operate at 1600 MHz with a second system clock configured to operate at 800 MHz.

3. The gateway device of claim 1, wherein said gateway device comprises a network access point.

4. The gateway device of claim 1, wherein said gateway device comprises a router.

5. A method of using a gateway device, said method comprising:
   operating a system clock at a clock frequency of 533 MHz;
   operating, via a processor configured to execute instructions stored on a 32 bit double data rate (DDR) memory, the 32 bit DDR memory at 1067 MHz to fall between harmonics of the system clock;
   providing, via the processor, at least 20 megabits throughput at greater than 10 decibels of attenuation
   instructing, via the processor, a radio to transmit data to be transmitted in a 2.4 GHz Wi-Fi band that is not impacted by the clock frequency, wherein the radio is configured to operate in the 2.4 GHz Wi-Fi band to wireless communicate with a client device; and
   instructing, via the processor, the radio to receive data to be received in the 2.4 GHz Wi-Fi band that is not impacted by the clock frequency.

6. The method of claim 5, wherein the 32 bit DDR memory is additionally configurable to operate at 1600 MHz with a second system clock configured to operate at 800 MHz.

7. The method of claim 5, wherein the gateway device comprises a network access point.

8. The method of claim 5, wherein the gateway device comprises a router.

9. A non-transitory, computer-readable media of a gateway device having computer-readable instructions stored thereon, the computer-readable instructions being capable of being read by a processor of the gateway device, wherein the computer-readable instructions are capable of instructing the gateway device to perform the method comprising:
   operating a system clock at a clock frequency of 533 MHz;
   operating, via the processor configured to execute instructions stored on a 32 bit double data rate (DDR) memory, the 32 bit DDR memory at 1067 MHz to fall between harmonics of the system clock;
   provide at least 20 megabits throughput at greater than 10 decibels of attenuation;
   instructing, via the processor, a radio to transmit data to be transmitted in a 2.4 GHz Wi-Fi band that is not impacted by the clock frequency, wherein the radio is configured to operate in the 2.4 GHz Wi-Fi band to wireless communicate with a client device; and
   instructing, via the processor, the radio to receive data to be received in the 2.4 GHz Wi-Fi band that is not impacted by the clock frequency.

10. The non-transitory, computer-readable media of claim 9, wherein the computer-readable instructions are capable of instructing the gateway device to perform the method wherein the 32 bit DDR memory is additionally configurable to operate at 1600 MHz with a second system clock configured to operate at 800 MHz.

11. The non-transitory, computer-readable media of claim 9, wherein the gateway device comprises a network access point.

12. The non-transitory, computer-readable media of claim 9, wherein the gateway device comprises a router.

* * * * *